United States Patent [19]

Kent

[11] Patent Number: 5,601,163

[45] Date of Patent: Feb. 11, 1997

[54] AUTOMATIC ADJUSTER FOR BRAKE CALIPERS

[75] Inventor: Richard L. Kent, White Deer, Tex.

[73] Assignee: IRI International Corporation, Pampa, Tex.

[21] Appl. No.: 610,732

[22] Filed: Mar. 5, 1996

[51] Int. Cl.$^6$ .................................. F16D 65/24
[52] U.S. Cl. ................. 188/170; 188/71.8; 188/196 R; 188/196 P; 188/264 F; 188/72.6; 188/72.9; 303/71; 303/10
[58] Field of Search ................. 188/71.7, 71.8, 188/71.9, 196 P, 72.4, 72.6, 72.9, 72.7, 274, 264 P, 72.3, 170, 265, 355, 358, 359, 58, 59, 264 F, 71.6, 292, 73.31, 196 R; 303/10–11, 9.76, 71, 116.3, 116.4

[56] References Cited

U.S. PATENT DOCUMENTS

| | | | |
|---|---|---|---|
| 2,406,304 | 8/1946 | Levy | 188/264 F |
| 2,808,903 | 10/1957 | Kovac | 188/196 P |
| 2,925,891 | 2/1960 | Sanford | 188/264 F |
| 2,964,136 | 12/1960 | Schnell | 188/264 F |
| 3,029,908 | 4/1962 | Wales | 188/264 F |
| 3,420,342 | 1/1969 | Botterill | 188/264 F |
| 3,439,781 | 4/1969 | Ostwald | 188/196 P |
| 3,542,160 | 11/1970 | Sacchini | 188/82.6 |
| 3,580,365 | 5/1971 | Bialkowski | 188/71.8 |
| 3,633,715 | 1/1972 | Burnett | 188/71.8 |
| 3,722,637 | 3/1973 | Kershner | 188/196 P |
| 3,949,843 | 4/1976 | Holcomb, Jr. | 188/71.8 |
| 3,986,584 | 10/1976 | Wright et al. | 188/71.8 |
| 4,014,410 | 3/1977 | Bryant | 188/264 P |
| 4,351,419 | 9/1982 | Garrett et al. | 188/196 D |
| 4,457,408 | 7/1984 | Montalvo. III | 188/170 |
| 4,706,459 | 11/1987 | Burckhardt | 18/264 F |
| 4,773,513 | 9/1988 | Herrmann et al. | 188/274 |
| 4,795,005 | 1/1989 | Wirth | 188/72.3 |
| 5,038,896 | 8/1991 | Wirth | 188/59 |
| 5,176,227 | 1/1993 | Kohler | 188/59 |
| 5,253,736 | 10/1993 | Kohler | 188/59 |
| 5,255,961 | 10/1993 | Graham | 188/170 |
| 5,261,513 | 11/1993 | Vogelsang | 188/274 |
| 5,465,813 | 11/1995 | Lichter | 303/9.76 |

Primary Examiner—Douglas C. Butler
Attorney, Agent, or Firm—Jones, Day, Reavis & Pogue

[57] ABSTRACT

Apparatus for automatically compensating or adjusting for the slack or added travel as frictional material on brake pads wears during repetitive brake applications. A stack of snap rings each having a gap in its periphery is collapsed or compressed and assembled onto the inside diameter of a wall of a hydraulic pressure applied cylinder portion. The wall inside diameter has a shoulder with a first diameter that holds the snap rings in their compressed condition. Contiguous to that section is a second wall section having a diameter larger than the first section such that as the cylinder is extended further during a braking action because of wearing of the brake pads, one of the snap rings is forced into the larger diameter area thus expanding it and preventing the wall portion of the cylinder from returning to its original position, thus maintaining the gap constant.

9 Claims, 5 Drawing Sheets

AUTOMATIC ADJUSTER FOR BRAKE CALIPERS

BACKGROUND OF THE INVENTION

1. Field of the Invention

The present invention relates in general to apparatus for automatically taking up slack in a system where wear occurs and in particular to a brake caliper system where the wear on the friction material used for braking action causes a misadjustment of the brakes and in which the present invention automatically compensates for the wear of the friction material forming the brake pads.

2. Description of Related Art Including Information Disclosed Under 37 CFR 1.97 and 1.98

It is well known in the prior art that in braking systems in particular where brake pads are applied to a rotating surface that wear of the brake pad material occurs thus causing a change in the distance the pads must move before engaging the brake surface creating less available brake application force and an increase in brake application time.

It is also well known, as for instance, in automobile brake applications, that automatic adjusting devices have been developed that attempt to compensate for wear of the brake pad material.

This problem is especially noticeable in systems where large amounts of braking force must be applied. For instance, in oil field equipment, huge drums carrying thousands of feet of cable lifting pipe strings weighing hundreds of tons must have giant disc brakes where tons of force are applied to the brake pads to brake or lock the drum against enormous weights that are attempting to rotate the drum. In such cases, the brakes are checked frequently and, when excessive wear is detected, the gap between the brake shoe and the rotating drum disc is manually adjusted to provide the proper gap so that proper braking action can occur.

It would be advantageous to have an automatic adjusting system that would compensate for a predetermined wear of the disc pad material and provide the appropriate gap between the brake pad material and the rotating disc surface forming part of the drum that carries the weight of the cable and drill string.

SUMMARY OF THE INVENTION

The present invention provides means for automatically compensating or adjusting for slack or added travel in a brake system as the friction material on the brake pads wears during repetitive brake applications. To compensate for this wear, a stack of multiple snap rings, or any circular spring with a gap in its periphery that can be compressed to a smaller diameter, is assembled onto a first inside diameter of a hydraulic pressure applied cylinder. A second inside diameter of the hydraulic pressure cylinder is joined to the first inside diameter by a shoulder. The second inside diameter is sufficient to fully receive the snap rings when they are in their free or expanded state. The number of snap rings used is determined by the minimum tolerable gap between the rotor and the opposing surfaces of the brake pad friction material. This gap is the space left between the stack of snap rings and the shoulder on the inside diameter of the cylinder tube. The stack of snap rings is retained on the inside of the cylinder in such a way that the space between the shoulder and the snap rings remains constant during application of hydraulic pressure in the cylinder. As the friction material wears, the step between the smaller diameter and the larger diameter moves closer toward the stack of rings until eventually the first ring springs out from the smaller diameter into the larger diameter of the split tube thus automatically reducing the gap between the friction material and the rotors because the cylinder rod is kept from retracting to its initial position. The snap rings are collapsed by installing a split tube over them and bolting the split tube together. This split tube has the two different sized inside diameters. The smaller diameter retains the rings to their collapsed diameter and the larger diameter accommodates the free (sprung out or expanded) outside diameter of the rings. The split tube is rigidly connected to the cylinder rod and therefore moves with the rod during brake application.

Thus it is an object of the present invention to provide means for automatically compensating or adjusting the gap between a brake rotor surface and the friction pads of the brake as the friction pads wear.

It is still another object of the present invention to automatically compensate for the distance the brake piston must travel as the brake pad material wears.

It is yet another object of the present invention to compensate for travel of a brake rod as the friction material of the brake pad wears by providing a stack of snap rings with a space left between the top of the stack of snap rings and a fixed shoulder on the inside diameter of a cylinder tube such that as the travel of the cylinder rod is increased due to brake wear, the bottommost snap ring will eventually be forced into the larger diameter area where it will block the return of the cylinder to its original position thus maintaining a substantially constant minimum gap between the brake pad material and the rotor surface against which the brakes are applied.

Thus the present invention relates to an automatic slack adjustment device for pivotal brake caliper arms having first and second ends and brake pads at one end on opposing sides of a disc-type brake drum or rotor for automatically adjusting the caliper arms as the brake pads wear, the device comprising a first housing containing an initial gap adjusting device between the brake pads and the brake drum and an automatic brake-locking device, the first housing having an outer end and an inner end, coupling means for attaching the inner end of the first housing to the other end of one of the caliper arms, a second housing having an inner end and an outer end, the outer end being attached to the outer end of the other one of the caliper arms, the inner end being movable with respect to the outer end. A central shaft in the first housing has first and second ends, the second end of the shaft extending outwardly of the first housing and being biased toward the second housing. A threaded shaft extends outwardly from the inner end of the second housing and axially contacts the second end of the central shaft extending from the first housing. A first conduit in the first housing provides pressure to move the biased central shaft outwardly while the threaded shaft is rotated to keep it in axial contact with the central shaft to obtain a proper gap between the brake pad and the disc-type brake drum. A second orifice in the second housing provides pressure for selectively moving the inner end of the second housing from a rest position towards the central shaft to provide a braking force to the caliper arms. Automatic slack adjusting means is formed in the second housing for preventing the inner end of the second housing from returning to its rest position when the brake pads have experienced sufficient wear thereby maintaining the gap automatically.

The automatic slack adjusting means comprises an inner cup-shaped end on the second housing having a first portion with a first inside diameter and a second contiguous portion having a second inside diameter greater than the first inside diameter. An inner cylinder end on the outer end of the second housing is inserted in the inner cup-shaped end, the inner cylinder end having an outside diameter spaced from and being slidably associated with the first and second inside diameters of the first body portion inner cup-shaped end. An orifice is formed in the second housing for enabling fluid under pressure to force the first and second body portions apart a predetermined distance to close the brake calipers and provide a braking action. A plurality of stacked split snap rings are compressed in the space between the first inner diameter of the cup-shaped end and the outside diameter of the inner cylindrical end. An annular retaining ring in the space between the second inner diameter of the cup-shaped end and the outer diameter of the inner cylinder forms a space into which the split snap rings can expand. A projection on the outer diameter of the inner cylindrical end prevents the plurality of stacked split rings from moving with respect to the inside diameter of the inner cup-shaped end such that, when the first and second body portions are forced sufficiently far apart due to wear of the brake caliper pads, one of the compressed snap rings is forced into the space between the inner cylindrical end and the second inside diameter of the inner cup-shaped end above the retainer ring to prevent the first body portion from returning to its original rest position when pressure is removed thus compensating automatically for any brake caliper wear.

BRIEF DESCRIPTION OF THE DRAWINGS

These and other features of the present invention will be more fully disclosed when taken in conjunction with the following DETAILED DESCRIPTION OF THE PREFERRED EMBODIMENTS in which like numerals represent like elements and in which.

DETAILED DESCRIPTION OF THE PREFERRED EMBODIMENTS

Figure 1:
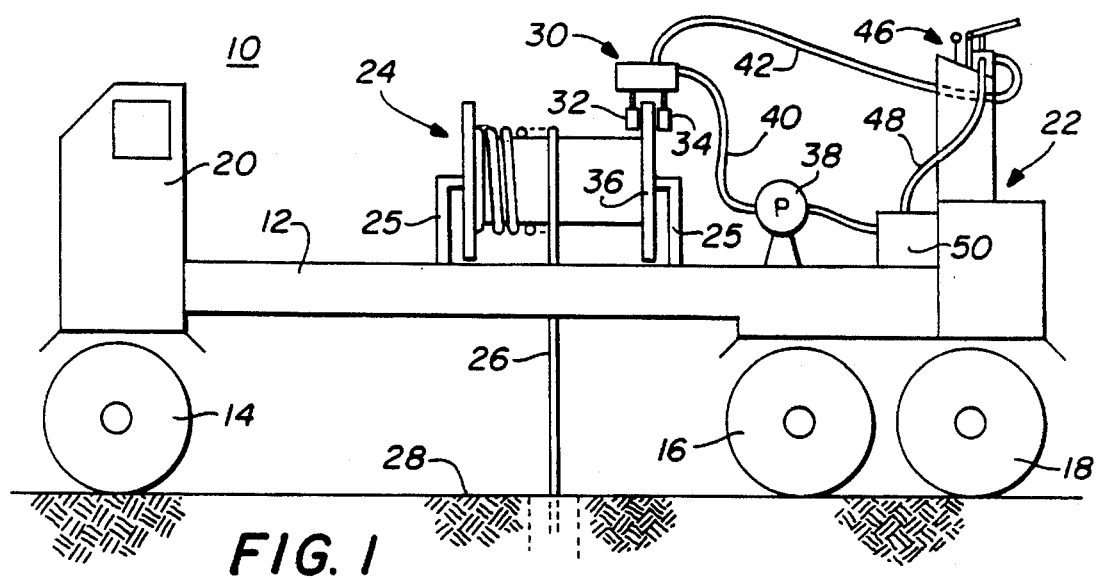
FIG. 1 is a schematic representation of a vehicle containing elements of the present invention.

FIG. 1 is a general schematic arrangement of a vehicle on which the novel hydraulic brake system of the present invention is utilized. The vehicle 10 has a frame 12 mounted on wheels 14, 16, and 18 for movement thereof. A personnel cab 20 is provided for an operator to control the vehicle. An operator stand 22 is provided at the rear of the vehicle for controlling a spool or drum 24 mounted on frame 12 by supports 25. The spool 24 may contain a cable 26 that extends down into the earth 28 for coupling to a drill string or the like. Because of the tremendous weight on the drum 24 caused by the cable 26 and its attached load, a caliper-type brake system 30 is provided with brake pads 32 and 34 selectively movable towards and away from a disc brake surface 36 on the drum 24. A pump 38 pulls hydraulic fluid from a tank 50 through a hose 40 to the hydraulic brake system 30. The hydraulic fluid returns through fluid line 42 to an operator-controlled valve 46 to control the brake system 30 and then the hydraulic fluid returns through hose 48 to the tank 50.

The novel elements of the present invention include the braking system 30, the operator-controlled lever valve 46, and the manner in which the hydraulic brake system 30 and operator-controlled valve 46 is constructed so as to allow the system of FIG. 1 to operate in extremely cold areas where the temperature may be as low as 60° below zero Fahrenheit. In such temperatures, the hydraulic fluid becomes sticky and tends to congeal. Thus it becomes very viscous. In attempting to operate a hydraulic brake 30 under such conditions, the system does not immediately respond because of the viscosity of the hydraulic fluid. In the system shown in FIG. 1, the novel brake cylinder system 30 and the control valve 46 are so constructed that the pump 38 can continually cause the hydraulic fluid to flow through line 40 through brake valve 30, hose 42, operator control valve 46, and back to the tank 50 through hose 48 so that the viscosity of the fluid is kept to a minimum until it is needed, at which time it will provide immediate response in the cylinders where needed.

Figure 2:
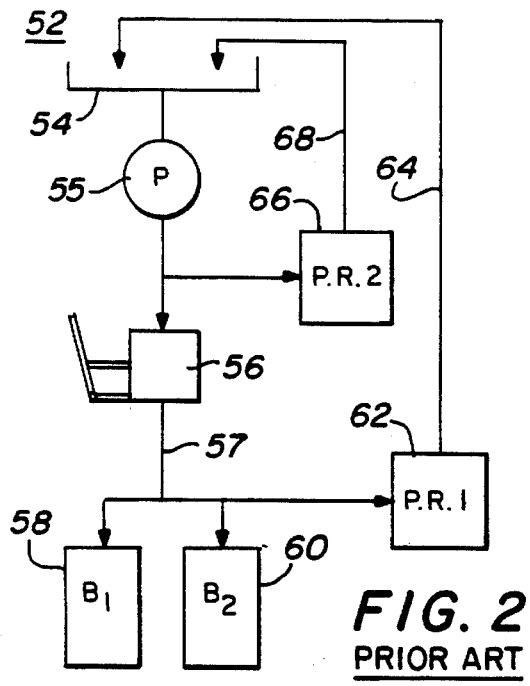
FIG. 2 is a schematic hydraulic arrangement of the prior art system for applying pressure to brake cylinders.

FIG. 2 is a schematic illustration of a prior art hydraulic system where the problems with the viscosity of the hydraulic fluid in low temperatures occur. The system 52 includes a hydraulic reservoir 54 that is coupled to a pump 55. When the pump 55 is running and the operator-controlled valve 56 is closed, the pressure is passed through a pressure relief valve 66 through line 68 back to the tank 54. At extremely low temperatures, the hydraulic fluid will be very viscous and have difficulty not only being pumped by the pump 55 but also in passing through the pressure relief valve 66 and returning to the tank 54 through line 68. When pressure is to be applied to the brake pads 58 and 60, the operator partially opens the lever-controlled valve 56 to allow hydraulic fluid to force the brake pads 58 and 60 against the rotor or brake drum 36 (in FIG. 1). Again, because the hydraulic fluid is so cold and viscous, it takes a period of time before the brake pads 58 and 60 can react. If the pressure in the line 57 exceeds a predetermined amount, pressure relief valve 62 will open thus venting the fluid through line 64 back to tank 54. This system has many problems associated with it because of extremely low temperatures.

Figure 3:
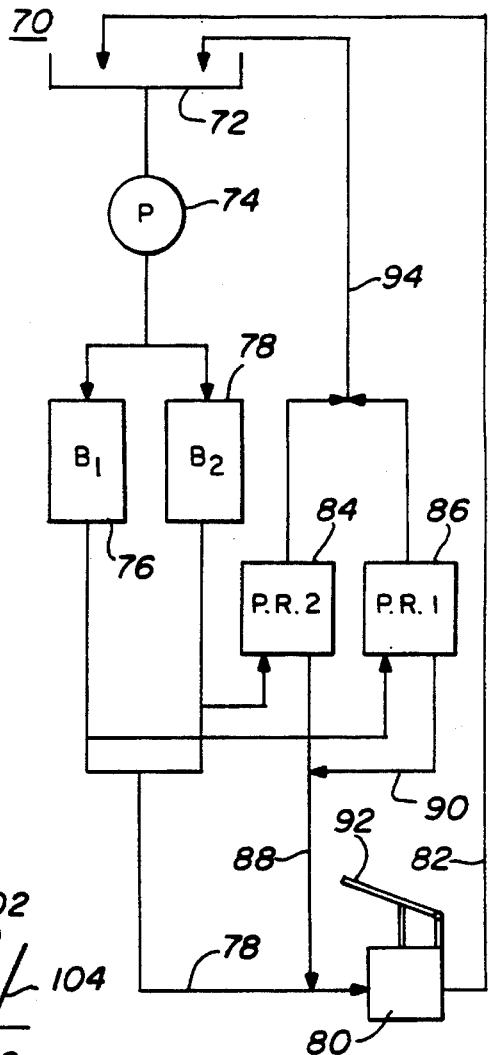
FIG. 3 is a schematic hydraulic circuit representation of the present invention for controlling the pressure applied to brake cylinders.

FIG. 3 is a schematic representation of the hydraulic of the present invention which avoids the problem of the prior art due to cold temperatures. The system 70 of FIG. 3 allows the oil or hydraulic fluid to be continuously circulated from the reservoir 72 by pump 74 through all of the valves and cylinders of the present invention in a constant flow in a loop back to the reservoir 72 to maintain the fluid in a flowable condition. Thus in FIG. 3, the brake cylinders 76 and 78 are constructed such that normally the hydraulic fluid from pump 74 will simply flow through the valves through line 79, and through the operator-controlled lever valve 80 and return line 82 to the reservoir 72. In addition, as the fluid exits the brake cylinders 76 and 78, it passes through pressure relief valves 84 and 86 and out on lines 88 and 90 to the operator-controlled lever valve 80 and through line 82 again back to the tank 72. When the operator desires to operate the brakes 76 and 78, he simply depresses lever 92 to restrict the amount of fluid flow through valve 80. This builds up a pressure in brake cylinders in 76 and 78 causing them to apply to pressure to the rotor. If the pressure exceeds a predetermined amount, the pressure relief valves 84 and 86 open and couple fluid back to the tank 72 on line 94. Thus the fluid circulates continually through all of the novel valves and cylinders until actuated; thus a constant fluid flow is provided to maintain less viscosity of the fluid. The valves are designed such, as will be seen hereafter, that when the pressure flow in the line back to the tank is decreased by manually-operated lever control valve 80, then the valves and pistons work or function as intended. Thus the novel system maintains the fluid in a flowable state even in extremely cold weather enabling quick response at times when the various hydraulic actuators are activated.

Figure 4:
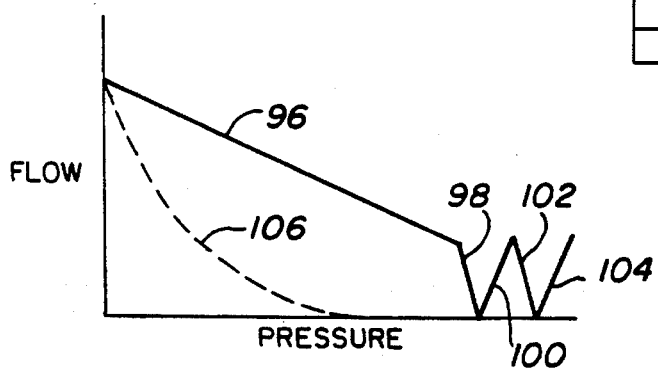
FIG. 4 is a graph comparing the pressure regulation of the hydraulics in the prior art with the present invention.

FIG. 4 is a graph in which the curve 96 illustrates the hydraulic flow in the system versus pressure as the typically constructed operator-controlled valve 80 in FIG. 3 is operated. Thus as the flow is decreased, the pressure in the lines increases as indicated by the curve 96. At a certain point, when the valve is almost closed, continued pressure on the lever 92 will cause the valve to suddenly shut off as indicated by 98. When the operator tends to let up on the handle 92 to allow some fluid flow, it will immediately jump along line 100 to some point where, again, the operator will try to push the handle back down and the flow will again go to zero as indicated by line 102. The process is repeated at 104 and the valve tends to chatter. It would be desirable to have a valve that would operate according to curve 106 wherein there is a smooth exponential decrease in fluid flow with an increase in the pressure.

Figure 5A:
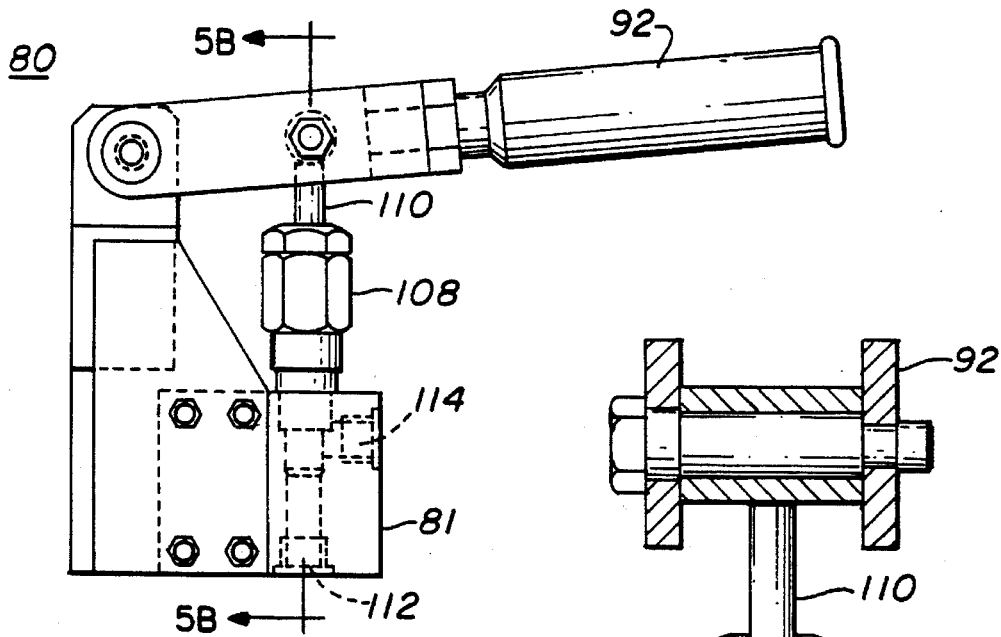
FIG. 5A, B, and C are a side view, a cross-sectional view, and a top view respectively of the novel lever operated pressure control valve for controlling caliper brakes of the present invention.

Such a novel valve is illustrated in FIGS. 5A, B, and C. As can be seen FIG. 5A, the manually-controlled, lever-operated valve 80 comprises a valve body portion 81 that has a pivotally mounted handle 92 operating a piston 110 extending into body 108 that extends from body portion 81. A fluid inlet port 112 and fluid exit port 114 is formed in the body portion 81.

Figure 5B:
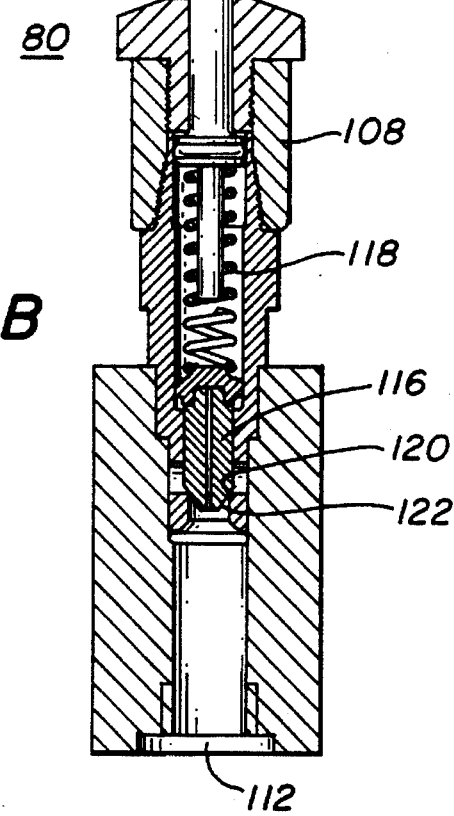

FIG. 5B is a cross section of the valve shown in FIG. 5A taken along lines 5B—5B. It can be seen that the piston 110 inside of housing 108 forces a compression-type spring 118 against a valve spool 116. The valve spool 116 has a truncated cone portion 122 that seats against sloping surface 120.

Figure 5C:
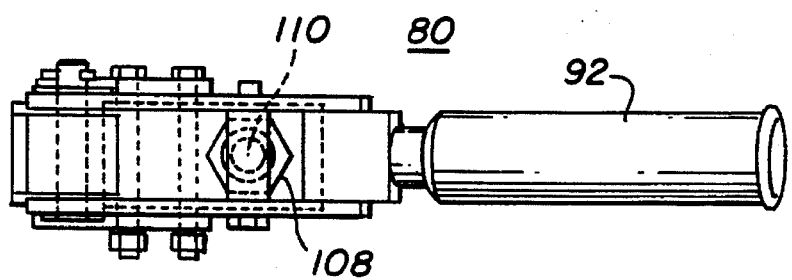

When the fluid entering port 112 exceeds the pressure of spring 118, valve spool 116 moves away from the valve seat 120 and the fluid exits through port 114 (FIG. 5A). However, when the operator applies pressure to handle 92 to tend to force spring 118 against the valve spool 116 such that the truncated cone 122 moves toward the valve seat 120, the pressure gradually decreases in a substantially exponential manner because of the truncated cone 122 and its matching sloping valve seat 120. Thus there is no immediate shut off of the valve with the concomitant high pressure. Therefore the valve does not chatter, the pressure can be increased from a very low pressure to a very high pressure in a smooth manner, and the operator has a "feel" for the amount of pressure that is being applied in the brake lines to the brake pads shown in FIG. 1. Thus this invention is a lever-operated, direct-acting relief valve for controlling the hydraulic cylinders on the caliper brakes 30 illustrated in FIG. 1. The inherent characteristics of a direct-acting relief valve provide a feedback or sensation of reactive force relative to pressure. The direct-acting relief valve includes a valve spool of conical shape. The conical surface bears against the matching sloping seat in the valve body. The conical surfaces are exposed to the fluid pressure that is common to the fluid pressure on the caliper cylinder. The opposing end of the valve spool is connected through a spring to the lever providing a direct path for lever operating force to react to the fluid pressure. Therefore, the fluid pressure is directly reflected by the amount of force applied to the lever resulting in a sensory perception of pressure being applied to the caliper cylinders. FIG. 5C is a top view of the novel valve 80.

Figure 6:
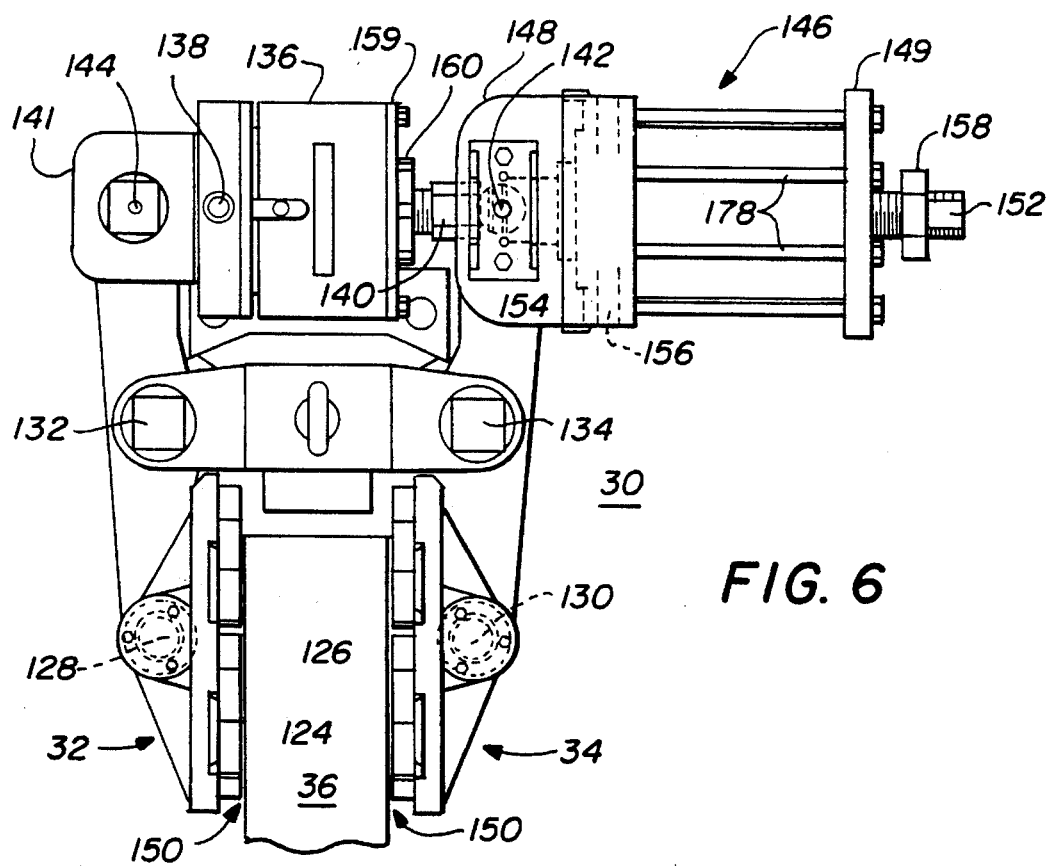
FIG. 6 is a top view of the novel brake system of the present invention.

FIG. 6 is a plan view of the novel caliper brakes that are controlled by the direct-acting, lever-operated pressure control valve 80 of FIG. 5. The caliper brake system 30 illustrated in FIG. 6 controls caliper arms 32 and 34 having brake pads 124 and 126 pivotally mounted at 128 and 130, respectively, to the caliper arms 32 and 34 and which are applied against the walls of the rotor or drum 36 to apply the braking action.

The caliper arms 32 and 34 are pivotally attached to supports on the vehicle frame (not shown) at pivot points 132 and 134. A service cylinder 136 receives hydraulic fluid through a port 138 from the hydraulic pump 38 shown in FIG. 1 and causes threaded bolt 140 to move outwardly causing pivot points 142 and 144 to move apart, thus causing brake pads 124 and 126 to be applied to the rotor or drum 36 to apply braking action thereto.

Spring brake cylinder 146 is mounted by arms 148 and 150 (both shown in FIG. 7) to pivot point 142 of the outer end of caliper arm 34. Its function twofold. First, it is used to adjust the initial gap 150 between the brake pads 124 and 126 and the rotor 36 as will be disclosed hereafter. Second, it is used to apply a locking force to the brake pads 124 and 126 to lock them to rotor 36 whenever hydraulic fluid is removed from service cylinder 136. Thus it is a safety precaution. Thus the housing 146 has an inner end 148 for attachment to the outer end of pivoted brake caliper arm 34 and an outer end 149. A central shaft 150 in the housing 146 extends through the outer end 149 of the housing 146 and has an inner end 154 for engaging the threaded bolt 140 to couple the service housing 136 to the brake caliper pad 34. The other end 141 of the service housing 136 is connected to the outer end of caliper arm 32 at pivot point 144.

Figure 8:
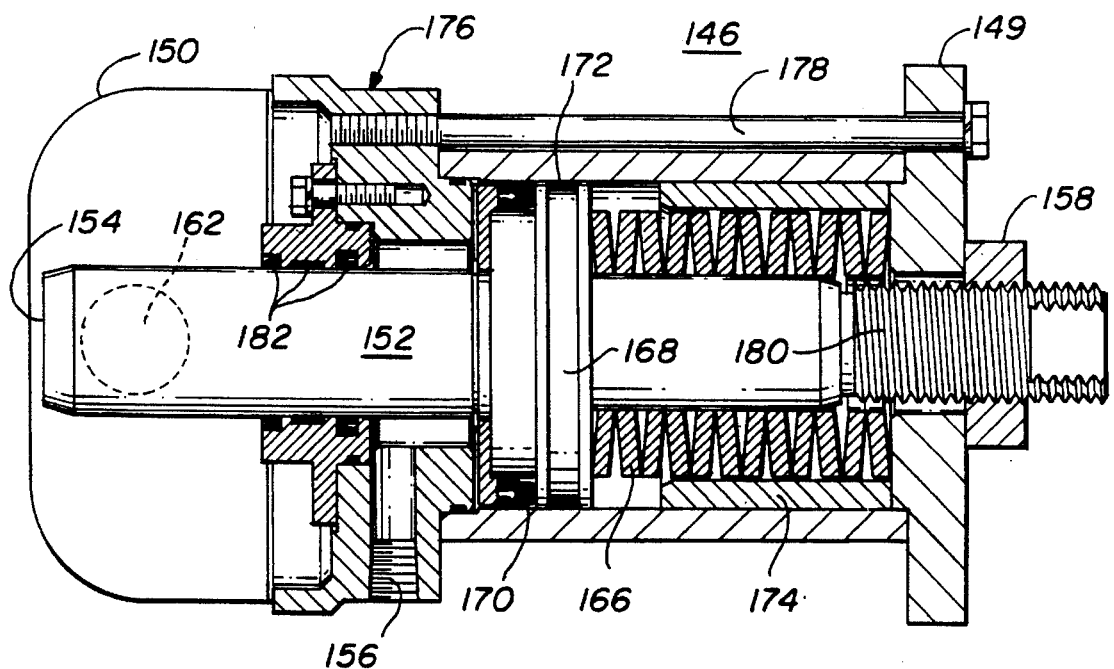
FIG. 8 is a cross-sectional view of the novel first housing illustrated in FIG. 7.

In operation, initially a hydraulic pressure is applied to the spring cylinder 146 through orifice 156 to compress springs therein as will be shown hereafter in relation to FIG. 8 and move the central shaft 152 outwardly from the outer end 149 of the service cylinder 146 thus moving caliper arm 134 outwardly at its outer end and inwardly about pivot 130 to adjust the gap 150 of the brake pad 126 with respect to the rotor 36. When that point it reached, lock nut 158 is tightened to hold the central shaft 152 in that position. Threaded bolt 140 extending from service cylinder 136 is unthreaded outwardly until it engages the inner end 154 of the central shaft 152. At that point, lock nut 160 is tightened thus holding threaded bolt 140 in its position in engagement with the inner end 154 of central shaft 152. Thus in this manner gap 150 can be adjusted as desired.

When all fluid pressure has been removed from the service cylinder 136, the compressed springs in spring cylinder 146 force central shaft 152 inwardly against threaded bolt 140 thus forcing service cylinder 136 against pivot point 148. The equal and opposite force in the other direction on pivot point 142 causes the caliper arms 32 and 34 to pivot inwardly about pivot points 132 and 134 and applies a braking force to the rotor 136 thus holding it in the locked position. Thus, the unit operates as a safety brake when all hydraulic pressure is removed from the service cylinder 136.

The details of the braking unit 30 shown in FIG. 6 is illustrated in FIGS. 7, 8, 9, and 10.

Figure 7:
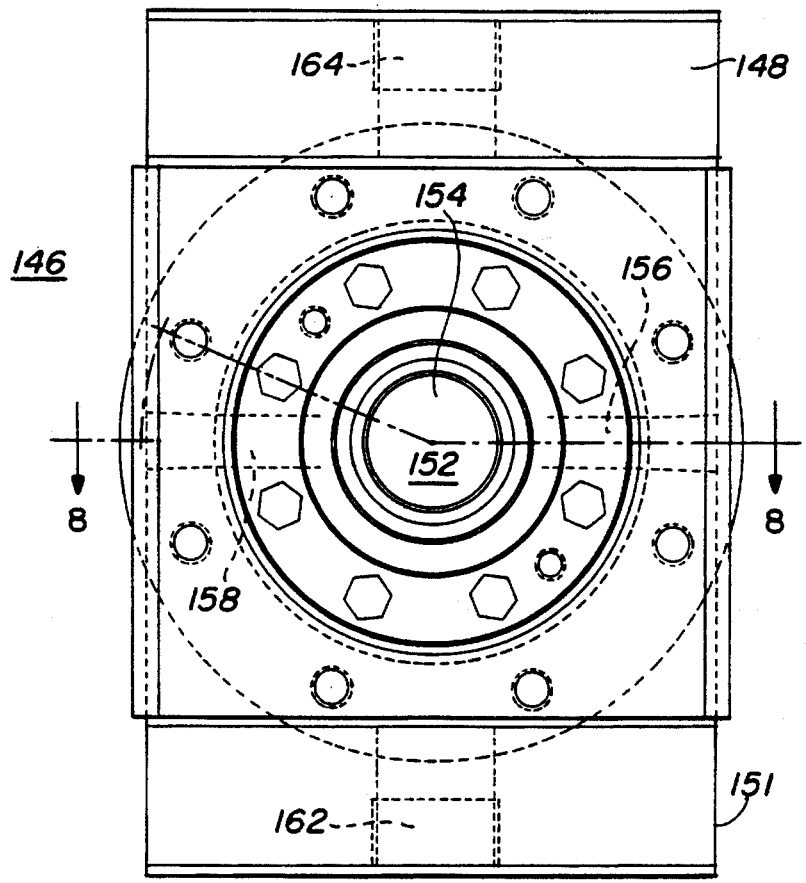
FIG. 7 is an end view of a first housing for enabling a brake gap to be set and to automatically lock the brakes when pressure is removed from the system.

FIG. 7 is an end view of the spring cylinder 146 taken from the inner mounting arm end 148 shown in FIG. 6. The mounting arms 148 and 151 can be seen in addition to the inner end 154 of central shaft 152. It will be noted that an entrance port 156 for hydraulic fluid and an exit port 159 are shown. When the system is unpressurized, the inlet port 156 and the exit port 159 allow fluid being pumped to pass through the spring cylinder 146 without having any effect but allowing the fluid to maintain its flowability. If, however, fluid flow is suddenly stopped at the exit port 159, pressure will build up inside the spring cylinder 146 causing it to function as described hereafter. Orifices 162 and 164 in spaced arms 148 and 15 1 allow bolts inserted therein to attach the arms 148 and 151 to the outer end of the caliper arm 134 at pivot point 142 shown in FIG. 6.

When it is desired to set the proper gap 150 between the brake pads 124 and 126 and brake disc 136, as shown in FIG. 6, fluid flow is slowed or stopped at exit port and the pressurized fluid provided in input port 156 forces piston 168 shown in FIG. 8 upwardly thus compressing spring-loaded discs 166 which are stacked with convex sides facing each other and concave sides facing each other as shown. When center shaft 152 has compressed the spring discs 166 sufficiently to provide the proper gap 150, the threaded bolt 148 is threaded out of the service cylinder 136 as explained earlier in relation to FIG. 6 until the bolt head 140 engages the end 154 of the center shaft 152. At that point, the nut 158 on the outer threaded end of center shaft 152 may be as shown in FIG. 6 at some distance away from the outer end 149 of the spring cylinder 146. The upper portion or outer end 149 of spring cylinder 146 is joined to the bottom or base portion 176 by means of bolts such as 178. It will be noted in FIG. 8 that an annular flange 174 surrounds the outer portion of the spring discs 166 to maintain them centered whenever center shaft 152 has the outer threaded portion 180 extending inwardly of the spring-loaded discs 166 as shown in FIG. 8. Appropriate seals 170, 172, and 182 seal the piston 168 and lower end of the spring cylinder 146 against a loss of any hydraulic fluid that is under piston 168.

Figure 9:
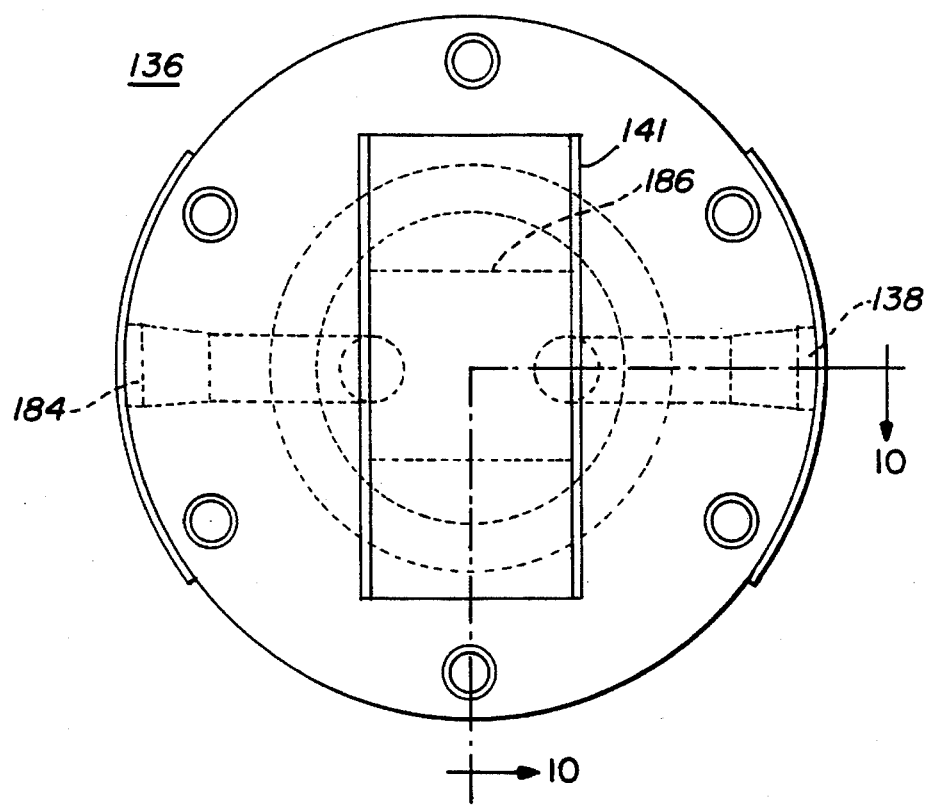
FIG. 9 is an end view of a second housing for the service cylinder that provides the hydraulic pressure to perform the braking action.

FIG. 9 is an end view of service cylinder 136 from the end with arm 141. Input fluid port 138 can be seen as well as an output port 184, which as explained earlier, allows fluid to circulate through the service cylinder 136 from input port 138 to output port 184 without actuating the cylinder so as to prevent the fluid from becoming extremely viscous in very cold weather. Connection end 141 has an orifice 186 therein so that it can be attached to the pivot point 144 on the outer end of caliper arm 32.

Figure 10:
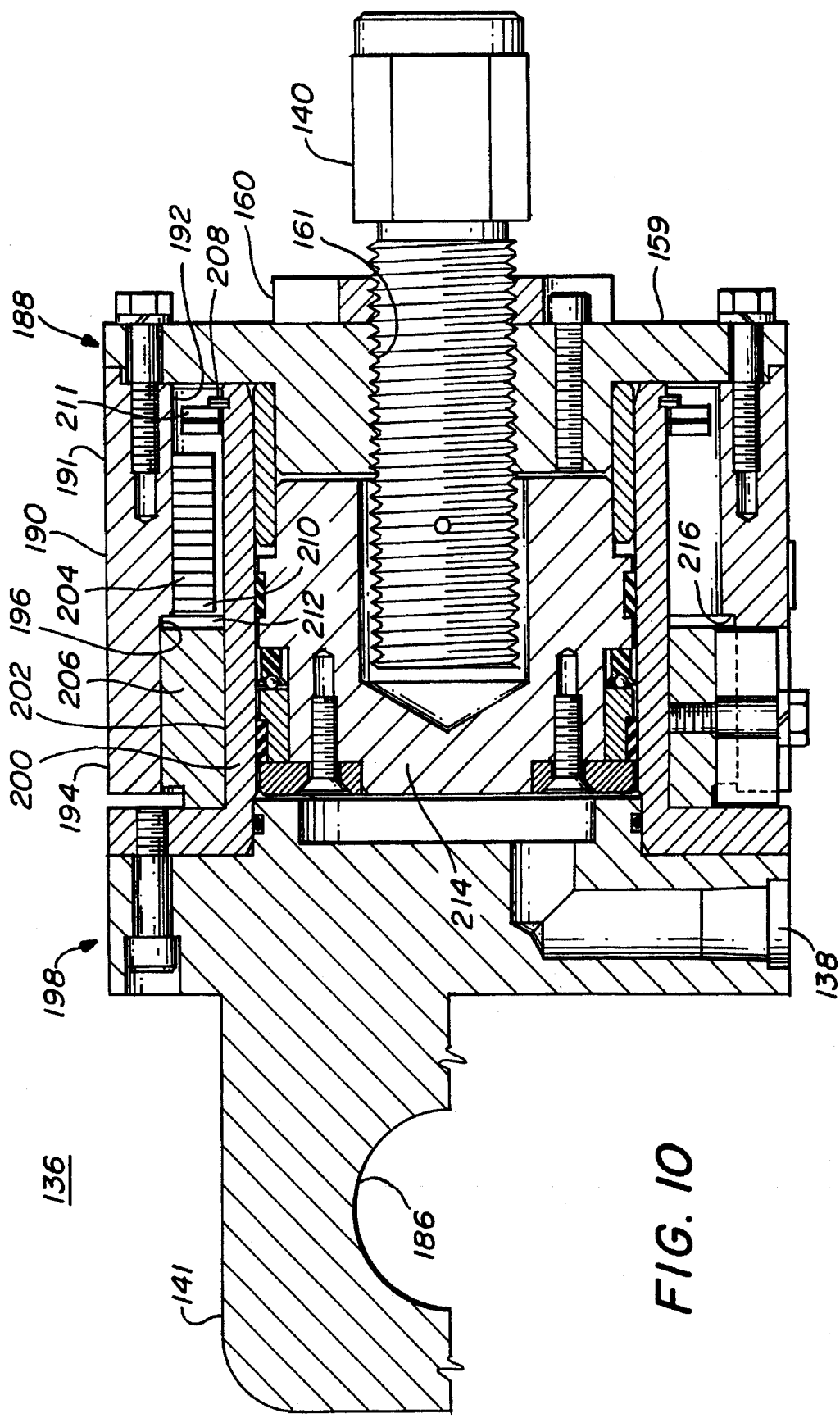
FIG. 10 is a cross-sectional view of the novel service cylinder taken along lines 10—10 of FIG. 9.

FIG. 10 is a cross-sectional view of the service cylinder 136 taken along lines 10—10 of FIG. 9.

Thus as can be seen in FIG. 10, the service cylinder 136 includes a first body 188 portion having an outer end 159 in which an orifice 161 receives threaded bolt 140 for coupling to one brake caliper pad 34 through the adjacent center shaft 152 of the spring cylinder 146 as shown in FIG. 6 and FIG. 8. It also has an inner cup-shaped end 188 having a side wall 190 with first portion 191 having a first inside diameter 192 and a second contiguous portion 194 having a second inside diameter 196 that is greater than the first inside diameter 192. A second body portion 198 has an outer end 141 for coupling to the second opposed brake caliper pad 32 and an inner cylindrical end 200 for insertion in the inner cup-shaped end 188. The inner cylindrical end 200 has an outside diameter 202 that is spaced from and slidably associated with the first and second inside diameters 192 and 196 of the first body portion inner cup-shaped end 188. An orifice 138 in the second body portion 198 enables fluid under pressure to force the first and second body portions 188 and 198 apart a predetermined distance to close the brake calipers 32 and 34 and provide a braking action.

A plurality of stacked split snap rings 204 are compressed in the space between the first inner diameter 192 of the cup-shaped end 188 and the outside diameter 202 of the inner cylindrical end 200. An annular retaining ring 206 is placed in a portion of the space between the second inner diameter 196 of the cup-shaped end 188 and the outer diameter 202 of the inner cylinder 200. Projections 208 and 211 on the outer diameter 202 of the inner cylindrical end 200 prevents the plurality of stacked split snap rings 204 from moving with respect to the inside diameter 202 of the inner cup-shaped end 188 such that when the first and second body portions 188 and 198 are forced sufficiently far apart due to wear of the brake caliper pads 32 and 34 (in FIG. 6), one of the compressed snap rings 210 is forced into the space 212 between the inner cylindrical end 200 and the second inside diameter 196 of the inner cup-shaped end 188 above the retainer ring 206. It expands in the area 212 and prevents the inner cup-shaped end 188 from resuming its original position when pressure is removed thus compensating automatically for any brake caliper wear.

As can be seen, each time pressure is applied through port 138 to the piston 214 forcing the inner cup-shaped end 188 outwardly, the stacked split snap rings 204 try to move with the wall 190. However, when they strike the projections 208 and 210, they are stopped in their movement and if the cup-shaped end 188 continues to move, the bottommost snap ring 210 is forced into the space 212 against annular retaining ring 206. When the pressure is removed from port 138 or piston 214, the springs in spring cylinder 146 force center shaft 152 against threaded bolt 140 and tries to force the cup-shaped end 148 back towards its original position. However it cannot move all the way back to its original position because the split snap ring 210 that has been forced into space 212 has now expanded and engages shoulder 216. Thus the wear of the brake pads is compensated and the gap is maintained. This accomplishes two results. First, it keeps the spring tension in the spring cylinder 146 constant since the springs have the same compression at all times and, second, because the gap is held constant, the brake travel is constant and thus brake application time remains constant.

Thus as disclosed herein the present invention provides several novel advances in the art.

First, a spring cylinder is combined with a hydraulic pressure service cylinder to automatically compensate or adjust for the slack or added travel of the brake pads as the friction material on the brake pads wears during repetitive brake applications. To compensate for this travel, a stack of a plurality of snap rings or any circular spring with a gap in its periphery that can be compressed (the outside diameter and inside diameter are reduced in size) are assembled onto the inside diameter of the hydraulic pressure applied service cylinder. The inside diameter of the hydraulic applied service cylinder has a shoulder sufficiently large to bear fully against the snap rings when they are in their free or sprung-out position. The number of snap rings used is determined by the minimum tolerable gap between the rotor or disc-type brake drum and the opposing surfaces of the brake pad friction material. This gap is the space left between the stack of snap rings and the shoulder on the inside diameter of the cylinder tube. The stack of snap rings is retained on the inside diameter of the cylinder in such a way that the space between the shoulder and the snap rings remains constant during application of the hydraulic fluid applied to the cylinder. As the friction material wears on the brake pads, the step between the smaller diameter and the larger diameter moves closer toward the stack of split rings until eventually the first split ring springs out into the larger diameter of the split tube, thus automatically reducing the gap between the friction material and the rotors or discs in that the cylinder rod is kept from retracting to its original position. The snap rings are collapsed by installing a split tube over them and bolting the split tube together. This split tube has two different size inside diameters. The smaller inside diameter retains the rings in their collapsed state and the larger diameter that is slightly larger than the smaller diameter allows the rings to expand to the larger inside diameter. The split tube is the cup-shaped cylinder and therefore moves with the piston during brake application.

The second novel feature disclosed herein is a fluid circulation path that contains cylinders that allow for continuous fluid circulation through all cylinders and controls for application of pressure to the cylinders. Each cylinder is designed with two fluid connections or ports in such a way as to allow fluid to enter the cylinder through the entry port, pass through the chamber of the cylinder and out through the exit port thus allowing the oil to circulate rather than remaining stagnant. The circulating oil will stay warmer and more flowable. To control the application of the pressure to the cylinder, a pressure relief valve, manually operated with a lever, is installed in the fluid conductor line connected to the exit connection of the cylinder. As force is applied to the lever of the pressure control valve, flow on the exit side of the cylinder is decreased and pressure inside the cylinder increases to the setting of the pressure control valve by means of the force applied to the lever. The hydraulic cylinders will then operate to perform the desired function.

The third novel invention disclosed herein relates to a lever-operated pressure control valve for controlling hydraulic cylinders on caliper brakes. The inherent characteristics of the direct-acting relief valve provide a feedback or sensation of reactive force relative to pressure. The direct-acting relief valve consists of a valve spool having a conical shape in the form of a truncated cone. The conical surface bears against a conical seat in the valve body. This conical surface is exposed to fluid pressure that is common to the fluid pressure on the caliper hydraulic cylinder. The opposed end of the spool is connected to the lever thus providing a direct path for lever-operating force to react against the fluid pressure. Therefore, the fluid pressure is directly reflected by the amount of force applied to the lever resulting in sensory perception of pressure being applied to the caliper cylinder. The operation of the valve is smooth from the closed position to the fully opened position and it does not chatter as it moves from the fully opened position to the closed position.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. An automatic slack adjustment device for pivotal brake caliper arms having brake pads on opposing sides of a disc-type brake drum comprising:

a first housing having first and second body portions (188, 198);

said first body portion having an outer end (140) for coupling to one brake caliper pad and an inner cup-shaped end having end plate and a sidewall with a first portion of side wall (190) having a first inside diameter and a second contiguous sidewall portion having a second inside diameter greater than the first inside diameter;

said second body portion having an outer end for coupling to a second opposed brake caliper pad and an inner cylindrical end for insertion in said inner cup-shaped end of said first body portion, said inner cylindrical end having an outside diameter spaced from and being slidably associated with said first and second inside diameters of said first body portion inner cup-shaped end;

an orifice in said second body portion enables fluid under pressure to force said first and second body portions apart a predetermined distance to close the brake calipers and provide a braking action;

a plurality of stacked split snap rings compressed in said space between said first inside diameter of said cup-shaped end and said outside diameter of said inner cylindrical end;

an annular retaining ring in the space between said second inner diameter of said cup-shaped end and said outer diameter of said inner cylinder; and a projection on the outer diameter of said inner cylindrical end to prevent said plurality of stacked split snap rings from moving with respect to said inside diameter of said inner cup-shaped end such that when said first and second body portions are forced sufficiently far apart due to wear of said brake caliper pads, one of said compressed snap rings is forced into the space between said inner cylindrical end and said second inside diameter of said inner cup-shaped end above said retainer ring to prevent said inner cup-shaped end from resuming its original position when pressure is removed thus compensating automatically for any brake caliper wear.

2. An automatic slack adjustment device as in claim 1 further including:

a base portion forming a portion of said inner cup-shaped end;

a threaded bolt inserted in an orifice in said base portion; and a brake caliper pad gap adjustment means associated with and engaging said threaded bolt such that the gap adjustment means can be moved and the threaded bolt rotated to maintain contact with said gap adjustment means until the correct gap adjustment is obtained between said brake pads and said disc-type brake drum.

3. An automatic slack adjustment device as in claim 2 further comprising:

a second housing having an inner end for attachment to one of said pivotal brake caliper arms and having an outer end;

a central shaft in said second housing as said brake caliper pad gap adjustment means and extending through said outer end (149) of said housing and having an inner end for engaging said threaded bolt and coupling said first housing to said one brake caliper arm;

biasing means in said second housing for biasing said central shaft towards said threaded bolt; and a pressure source for providing a fluid to overcome said biasing means to move said central shaft away from said bolt head to enable said gap to be set.

4. An automatic slack adjustment device as in claim 3 wherein said biasing means in said second housing comprises:

a piston connected to and surrounding said central shaft; and a plurality of stacked, spring-loaded, concave and convex washers surrounding said central shaft between said piston and said outer end of said second housing such that moving said piston toward the outer end of of said second housing with pressure from said pressure source compresses said stack of spring-loaded washers and stores energy therein.

5. An automatic slack adjustment device for pivotable brake caliper arms having first and second ends and brake pads at one end on opposing sides of a disc-type brake drum for automatically adjusting said caliper arms as said brake pads wear, said device comprising:

a first housing having an inner end and an outer end;

said outer end being attached to the outer end of one of the said caliper arms;

said inner end being movable with respect to said outer end;

a second housing containing an initial gap adjusting device for adjusting the gap between said brake pads and said disc-type brake drum and an automatic brake-locking device, said second housing having an outer end and an inner end;

coupling means (162) for attaching said inner end of said second housing to the other end of one of said caliper arms;

a central shaft in said second housing having first and second ends, the second end extending outwardly of said second housing and being biased toward said first housing;

a threaded shaft and bolt extending outwardly from the inner end of said first housing and axially contacting said second end of said central shaft extending from said second housing;

first pressure-providing means in said second housing to move said biased central shaft outwardly while said threaded shaft is rotated to keep it in axial contact with said central shaft to obtain a proper gap between said brake pads and said disc-type brake drum;

second pressure-providing means in said first housing for selectively moving said inner end of said first housing from a rest position towards said central shaft to provide a braking force to said caliper arms; and automatic slack adjusting means in said first housing for preventing said inner end from returning to its rest position when said brake pads have experienced sufficient wear thereby maintaining said gap automatically.

6. An automatic slack adjustment device as in claim 5 wherein said automatic slack adjusting means comprises:

an inner cup-shaped end on said first housing having a first sidewall portion with a first inside diameter and a second contiguous sidewall portion having a second inside diameter greater than said first inside diameter;

an inner cylindrical end on said outer end of said first housing for insertion in said inner cup-shaped end, said inner cylindrical end having an outside diameter (202) spaced from and being slidably associated with said first and second inside diameters of said first housing inner cup-shaped end;

an orifice in said first housing for enabling fluid under pressure to force said cup-shaped end and said inner cylindrical end apart a predetermined distance to close said brake calipers and provide a braking action;

a plurality of stacked split snap rings compressed in said space between said first inner diameter of said cup-shaped end and said outside diameter (202) of said inner cylindrical end;

an annular retaining ring in the space between said second inner diameter of said cup-shaped end and said outer diameter (202) of said inner cylinder; and a projection on the outer diameter of said inner cylindrical end (200) to prevent said plurality of stacked split snap rings from moving with respect to said inside diameter of said inner cup-shaped end such that when said cup-shaped end and said inner cylinder are forced sufficiently far apart due to wear of said brake caliper pads, one of said compressed snap rings is forced into the space between said inner cylindrical end and said second inside diameter of said inner cup-shaped end above said retainer ring to prevent said inner cup-shaped end from resuming its original position when pressure is removed thus compensating automatically for any brake caliper wear.

7. An automatic slack adjustment device as in claim 6 further including:

a base portion forming a portion of said inner cup-shaped end;

a threaded bolt inserted in an orifice in said base portion; and a brake caliper pad gap adjustment means in the form of said central shaft in said second housing associated with and engaging said threaded bolt such that the central shaft can be moved and the threaded bolt rotated to maintain contact with the central shaft until the correct gap adjustment is obtained between the brake pads and the disc-type brake drum.

8. An automatic slack adjustment device as in claim 7 wherein:

said second housing has an inner end for attachment to one of the pivotal brake caliper arms (34) and an outer end;

biasing means in said second housing for biasing said central shaft towards said threaded bolt; and said first pressure-providing means providing pressure to overcome the biasing means to move said central shaft away from said bolt head to enable said gap to be set.

9. An automatic slack adjustment device as in claim 8 wherein said biasing means in said second housing comprises:

a piston connected to and surrounding said central shaft; and a plurality of stacked, spring-loaded, concave and convex washers surrounding said central shaft between said piston (168) and said outer end of said second housing (146) such that moving said piston towards the outer end of said second housing with pressure from said pressure source compresses said stack of spring-loaded washers (166) and stores energy therein.

* * * * *